May 23, 1961

W. R. KEMPF ET AL 2,985,704

BATTERY CLIP

Filed May 2, 1957

INVENTORS
WALTER R. KEMPF
JOHN W. RHYNE, JR.

BY m.w.Gould

ATTORNEY

May 23, 1961  W. R. KEMPF ET AL  2,985,704
BATTERY CLIP
Filed May 2, 1957  2 Sheets-Sheet 2
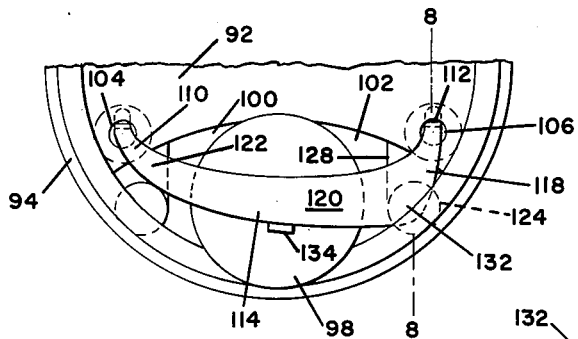
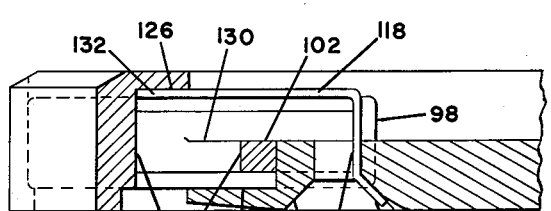
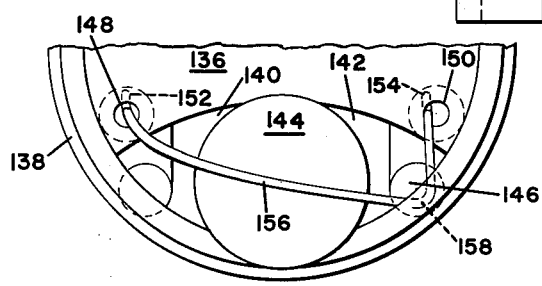
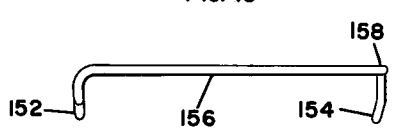
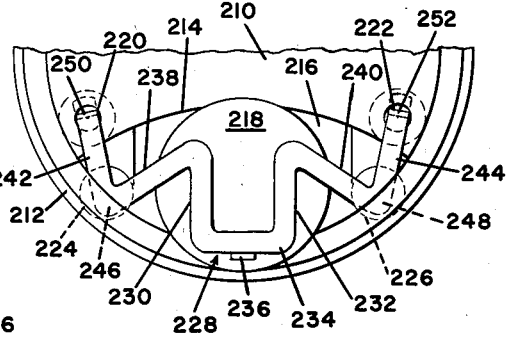
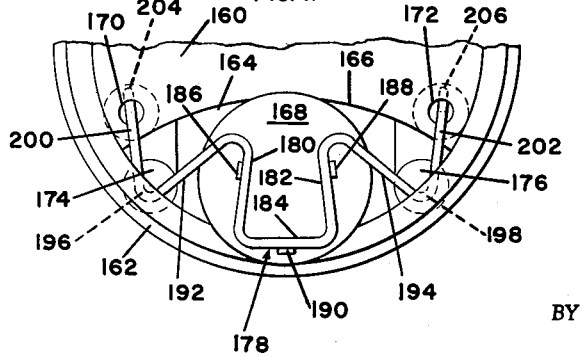
INVENTORS
WALTER R. KEMPF
JOHN W. RHYNE, JR.
ATTORNEY

United States Patent Office 2,985,704
Patented May 23, 1961

2,985,704

BATTERY CLIP

Walter R. Kempf, Lancaster, and John W. Rhyne, Jr., Columbia, Pa., assignors to Hamilton Watch Company, Lancaster, Pa., a corporation of Pennsylvania Filed May 2, 1957, Ser. No. 656,684

13 Claims. (Cl. 136—173)

This invention relates to battery driven watches and more particularly relates to a battery driven watch having a disk type battery mounted therein in an improved manner.

In assignee's copending application Serial No. 578,843, filed April 17, 1956, there is disclosed a battery operated electric watch having a disk type battery mounted therein by means of a clip relatively permanently secured to the pillar plate. While the clip mounting disclosed in that application is generally satisfactory, it has been found that some inconvenience is encountered in removing the battery and that there is some danger that slippage of the tweezers used in disengaging the clip might cause serious damage to the watch movement.

According to the present invention, we have now found that it is possible to mount the battery within the watch by means of clip arrangements which eliminate the need for passing the clip over the movement during insertion and removal. All tweezer work in removal of the clip and battery is done at a position where a slip of the tweezers at worst can only scratch the battery. The clips provided releasably engage the pillar plate and according to some embodiments of the invention also lock under the case ring. Removal of the clips is a simple and rapid procedure.

It is accordingly a primary object of the present invention to provide a battery driven watch having an improved battery retainer arrangement.

It is another object of the invention to provide a battery driven electric watch having a disk type battery fastened therein by means of a clip which may be removed and inserted without passing the clip over the movement.

It is another object of the invention to provide a battery driven watch having a disk type battery retained therein by means of a clip which releasably engages the pillar plate at at least two positions.

It is still a further object of the invention to provide a battery driven electric watch having a disk type battery mounted therein by means of a spring clip which releasably engages the case ring at at least one position.

These and further objects and advantages of the invention will become more apparent upon reference to the following specification and claims and appended drawings wherein:

Figure 7 is a plan view of the pillar plate and case ring of a battery operated watch having a disc type battery mounted therein according to another embodiment of the invention;

Figure 8 is a partial vertical section of the watch of Figure 7 taken along the line 8—8;

Figure 9 is a partial plan view of a battery operated watch having a disk type battery secured therein according to another embodiment of the invention;

Figure 10 is a side elevation of the clip used in the arrangement of Figure 9;

Figure 11 is a partial plan view of a battery operated watch having a disk type battery mounted therein according to another embodiment of the invention; and Figure 12 is a partial plan view of a battery operated watch having a disk type battery mounted therein according to still another embodiment of the invention.

Figure 1:
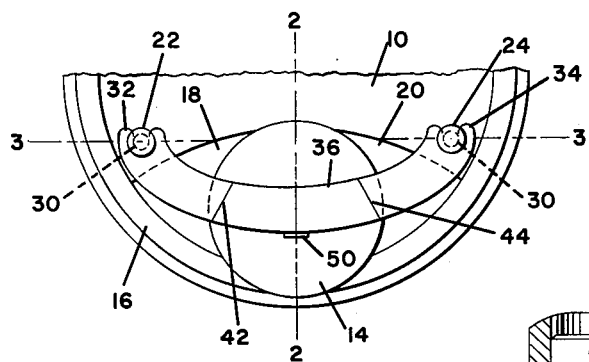
Figure 1 is a partial plan view of the pillar plate and case ring of a battery operated watch having a disk type battery mounted therein according to one embodiment of the invention.
Figure 2:
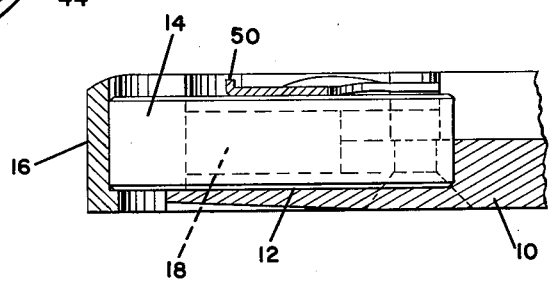
Figure 2 is a vertical section of the mechanism of Figure 1 taken along the line 2—2 of Figure 1.
Figure 3:
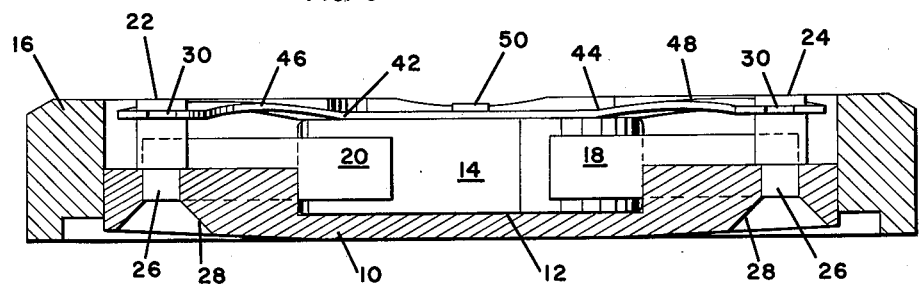
Figure 3 is a vertical section of the mechanism of Figure 1 taken along the line 3—3 in Figure 1.

Referring more particularly to Figures 1, 2 and 3, there is shown a battery operated watch having a pillar plate 10 which is provided with an arcuate recess 12 within which a disk type battery 14 is mounted. A case ring 16 is mounted about the pillar plate 10 and is provided with a pair of oppositely disposed inwardly extending arms 18 and 20 which position the battery against transverse movement. The watch itself may be of the type disclosed in assignee's copending application Serial No. 578,843, filed April 17, 1956, while the battery may be of the type disclosed in assignee's copending application Serial No. 548,660, filed November 23, 1955, now Patent No. 2,837,593.

Mounted in a pair of bores in pillar plate 10 are a pair of posts 22 and 24 which are friction fitted within the bores. Referring more particularly to Figure 3, it will be seen that the posts are provided with reduced diameter studs 26 at the lower ends thereof and these studs are friction fitted into the bores in the pillar plate. The bores are countersunk from the underside of the pillar plate at 28. The posts have reduced diameter sections 30 and these reduced diameter sections receive the ends 32 and 34 of an arcuate retaining clip 36.

Figure 4:
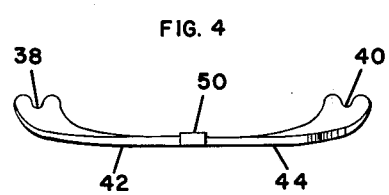
Figure 4 is a side elevation of the clip of Figures 1-3.

Each end of the clip 36 is slotted, as shown at 38 and 40, in Figure 4 and these slots receive the reduced diameter portions 30 of the posts and form a friction fit therewith. The bight of the clip 36 extends out over the battery 14, as is best seen in Figure 1, and the ends of the clip are bent upwardly at 42 and 44, so that they are resiliently bowed at 46 and 48 when mounted, so as to cause the clip to exert a downward force on the battery. The clip may be formed of any suitable resilient metal which is non-corrosive and a good conductor, such as beryllium copper. The clip may be provided with an upwardly struck tab 50 for ease of handling with tweezers.

It will be apparent from reference to Figure 1 that the clip 36 and battery 14 may be removed by grasping the tab 50 with tweezers and moving the clip downward in Figure 1. Any slip of the tweezers merely scratches the surface of the battery and does no damage to the watch movement. The battery and clip are reinserted in a converse manner, that is, by placing the battery in the depression 12 in the pillar plate and then laying the clip atop the battery and forcing it upward by means of a pair of tweezers grasping the tab 50.

Figure 5:
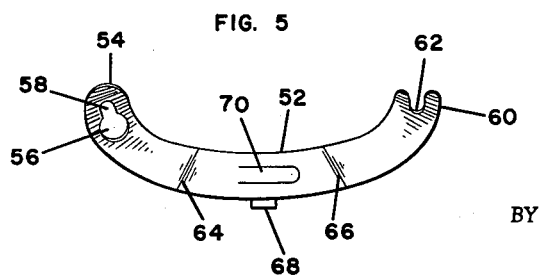
Figure 5 is a plan view of a further embodiment of a clip for use in a battery holding arrangement of the type shown in Figures 1-3.

Referring to Figure 5 there is shown another embodiment of a clip which may be used in the arrangement of Figures 1-3. According to this embodiment of the invention an arcuate clip 52 is provided with a first end 54 having a hole 56 and having a slot 58 of lesser width than the diameter of the hole connected to the hole. The other end 60 of the clip is slotted at 62. The clip is bent at 64 and 66 to provide the desired holding force when the clip is mounted and is provided with a tab 68. The hole 56 is large enough to receive one of the posts, while the slot 58 is only large enough to receive the reduced diameter portion of the post. Slot 62 is of a width to frictionally engage the reduced diameter portion of the other post.

In mounting and demounting this clip, the hole 56 is slipped over the post and the clip lowered until the slot 58 is opposite the reduced diameter portion 30. The clip is then slid downwardly so as to cause the reduced diameter portion of the post to enter the slot 58. The reduced diameter portion of the other post is engaged by the slot 62 on the other end of the clip. With this embodiment of the invention there is less possibility of unwanted movement of the clip when it is being engaged. A tab 68 may be provided on the clip for ease in handling with tweezers and a downwardly struck finger 70 may be provided for making good electrical contact with the battery. If desired the bends 64 and 66 may be dispensed with and the finger 70 relied upon to provide the holding force.

Figure 6:
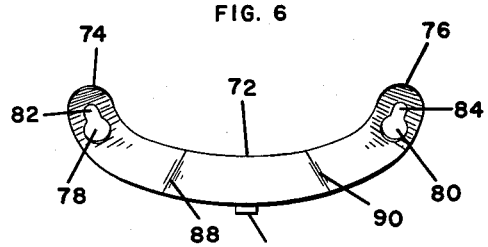
Figure 6 is a plan view of a further embodiment of a clip for use in a battery holding arrangement of the type shown in Figures 1-3.

Referring to Figure 6 there is shown another embodiment of a clip which may be used in the arrangement of Figures 1–3. According to this embodiment an arcuate clip 72 is provided with a pair of ends 74 and 76 and with holes 78 and 80 in the ends. The holes 78 and 80 are of a diameter to receive the posts 22 and 24. Connected to holes 78 and 80 are slots 82 and 84 which are of a width to frictionally engage the reduced diameter portions 30 of the posts. An upstanding tab 86 may be provided on the clip for facility of handling and the clip may be provided with bends 88 and 90 as in the preceding embodiments.

In mounting and demounting this clip, the holes 78 and 80 are slipped over the posts 22 and 24 and the clip is lowered until the slots 82 and 84 are opposite the reduced diameter portions 30. The clip is then slid downwardly so as to cause the reduced diameter portions of the posts to enter the slots.

While the embodiments of our invention shown in Figures 1 through 6 utilize a clip which engages only the pillar plate, our invention also contemplates the use of a clip which engages not only the pillar plate but also the case ring of the watch. Thus, referring to Figure 7, there is shown a watch having a pillar plate 92 and case ring 94. The pillar plate is recessed at 96, as in the preceding embodiments of the invention, and a disk type battery 98 is mounted on the recessed portion. The case ring 94 is provided with arms 100 and 102, as in the preceding embodiment, and these position the battery 98.

The pillar plate 92 is provided with a pair of holes 104 and 106 which are countersunk on the underside as shown at 108 in Figure 8. Received within the holes 104 and 106 are rear depending legs 110 and 112 of a clip 114. The lower ends of the depending legs are bent backwardly, as shown at 116 in Figure 8, at an angle equal to the angle of the countersink. Attached to depending leg 112 is a forwardly extending arm 118 which is connected to a transversely extending arm 120. Arm 120 terminates in a curved portion 122 which is connected to the other depending leg 110.

The case ring 94 and arm 102 are provided with an upwardly extending bore 124 which passes completely through arm 102 but stops short of the top of the case ring to form a shoulder 126, best seen in Figure 8. The arm 102 is milled out at 128 so that its surface 130 is flush with the adjacent surface of the pillar plate. The bore 124 and shoulder 126 receive the square end 132 of the clip formed by the juncture of arms 118 and 120. This end 132 engages the shoulder 126 to lock the clip in position. A tab 134 may be provided on the clip to facilitate handling it with tweezers. In the embodiment of clip shown in Figures 7 and 8, the depending legs 110 of 112 of the clip are bent backwardly so that after the corner 132 is inserted in the bore 124, it is necessary to spring these legs forward in order to insert the ends of the legs into the holes 104 and 106. When these legs are then released, the resiliency of the spring forces the legs backwardly and forces the bent lower portions 116 into engagement with the back sides of the holes 104 and 106 and their countersunk portions to lock the clip in position, as seen in Figure 8.

Removal and insertion of the battery is quite simple. The battery is removed by grasping tab 134 which tweezers and forcing the clip upwardly in Figure 7 against the resiliency of legs 110 and 112 until the corner 132 clears the shoulder 126 on the case ring. The lower portion of the clip is now free and legs 110 and 112 are free in holes 104 and 106 so that the clip may be simply lifted free. In inserting the clip in the watch, a converse procedure is used. The depending legs 110 and 112 are inserted into holes 104 and 106. The clip is then forced upward against the resiliency of these legs until corner 132 clears the case ring and can be sprung into bore 124 beneath shoulder 126.

As with the preceding embodiments of our invention, it is again possible to insert the battery without danger of damaging the watch movement in case of tweezer slippage. The clip may be formed of any suitable material, such as flat beryllium copper. While the clip utilized in this embodiment of the invention has depending legs which are sprung backwardly, it will be apparent to those skilled in the art that these legs could also be sprung apart from one another to engage the outermost surfaces of the holes 104 and 106 in order to provide a locking action.

Referring to Figures 9 and 10 there is shown another embodiment of our invention similar to that shown in Figure 7 but wherein the flat clip is replaced by a wire clip. Referring to that figure there is seen a pillar plate 136 mounted within a case ring 138 having oppositely disposed arms 140 and 142 positioning a disk type battery 144. The case ring 138 and arm 142 are bored at 146, as in the preceding embodiment of the invention, and the pillar plate is provided with countersunk holes 148 and 150.

Engaged within holes 148 and 150 are the depending legs 152 and 154 of a resilient wire clip 156 which is shaped like the clip described in connection with the preceding embodiment of the invention. The clip thus has a corner 158 which engages the case ring shoulder formed above the bore 146. The manner of inserting and removing this clip is the same as that employed with the clip shown in Figures 7 and 8.

Referring to Figure 11 there is shown another embodiment of our invention wherein a watch is comprised of a pillar plate 160 and case ring 162. The case ring has a pair of oppositely disposed arms 164 and 166, as in the preceding embodiments of the invention, and a disk shaped battery 168 is mounted therebetween. A pair of holes 170 and 172 are provided in the pillar plate and these are countersunk from the underside of the plate as in the preceding embodiments of the invention. The case ring 162 is provided with bores 174 and 176 which have overlying shoulders, such as the shoulder 126 shown in Figure 8.

A wire clip generally shown at 178 secures the battery in position. Clip 178 consists of a generally U-shaped central portion having generally parallel arms 180 and 182 and a connecting arm 184. Tabs 186, 188 and 190 are struck upwardly from these arms to provide grips for tweezers. Attached to the ends of parallel arms 180 and 182 are diagonal arms 192 and 194. These arms are bent into a V shape to form bights 196 and 198 which enter the bores 174 and 176 in case ring 162. Arms 200 and 202 extend from the bights 196 and 198 and terminate in depending legs 204 and 206 which enter the holes 170 and 172. The lower ends of depending legs 204 and 206 are bent to mate with the contour of the countersink in the holes, as in the preceding embodiments of the invention.

In inserting this clip the clip is first positioned so that the two depending legs 204 and 206 engage in the two pillar plate holes 170 and 172. The two tabs 186 and 188 are then grasped with tweezers and the parallel legs 180 and 182 brought together until the bights 196 and 198 are below the shoulders above bores 174 and 176 in the case ring 162. The tabs 186 and 188 are then released and the resiliency of the spring forces the bights into the bores in the case ring to secure the battery in position.

Referring to Figure 12 there is seen still a further embodiment of our invention utilizing a clip shaped similarly to that shown in Figure 11 but formed of flat resilient metal such as beryllium copper. A pillar plate 210 is mounted in a case ring 212 having arms 214 and 216 positioning a battery 218. The pillar plate is provided with countersunk holes 220 and 222 and the case ring is provided with bores 224 and 226 having shoulders thereover as in the preceding embodiments of the invention.

A clip shown generally at 228 is comprised of a U-shaped portion consisting of parallel arms 230 and 242 and a cross arm 234 having an upwardly struck tab 136 thereon. Parallel arms 230 and 232 are connected to diagonal arms 238 and 240 and these are in turn connected to arms 242 and 244 by bights 246 and 248. Arms 242 and 244 have depending legs 250 and 252 at the ends thereof and these enter holes 220 and 222. Bights 246 and 248 are received in bores 224 and 226 beneath the overlying shoulders.

In inserting this clip the tab 236 is grasped with tweezers and the depending legs 250 and 252 inserted in the holes 220 and 222. The clip is then forced upwardly against the resiliency of these legs until the bights 246 and 248 can be snapped into bores 224 and 226 beneath the overlying shoulders. The battery is then secured in position. In removing the battery a converse precedure is effected.

It will be apparent from the foregoing that we have provided battery mountings for electric watches which facilitate the insertion and removal of the batteries without danger of damage to the watch movement. The mountings provided according to our invention are both inexpensive and simple and operate in a manner which is apparent to any jeweler from a mere inspection.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. In an electric time piece, a pillar plate, a battery mounted vertically on said pillar plate, an elongated spring clip overlying and engaging the upper surface of said battery, a pair of spaced posts on said pillar plate, said clip having ends releasably engaging said posts.

2. A device as set out in claim 1 wherein the ends of said clip are slotted and engage reduced diameter portions of said posts.

3. A device as set out in claim 2 wherein said posts have reduced diameter studs at the lower ends thereof, said studs being received in bores in said pillar plate.

4. In an electric time piece, a pillar plate, a battery mounted vertically on said pillar plate, a case ring about said pillar plate, said pillar plate having a pair of spaced holes therein, said case ring having at least one recess therein facing the center of said pillar plate, and a spring clip engaging the upper surface of said battery, and having portions resiliently engaging said holes in said pillar plate and said recess in said case ring.

5. A device as set out in claim 4 wherein said clip comprises a first arm joined to a second arm to form a corner which enters said recess.

6. A device as set out in claim 5 wherein said arms have depending legs attached thereto and said legs enter said holes.

7. A device as set out in claim 6 wherein said holes are countersunk and said depending legs are bent to engage said countersunk portions of said holes.

8. A device as set out in claim 4 wherein said clip has a generally U-shaped portion engaging said battery.

9. A device as set out in claim 8 wherein said U-shaped portion has a pair of diagonal arms attached thereto and extending toward said case ring, and terminal arms attached to said diagonal arms and engaging a pair of recesses in said case ring at said points of attachment.

10. A device as set out in claim 9 including depending legs attached to said terminal arms and entering said holes in said pillar plate.

11. A device as set out in claim 10 wherein said holes are countersunk and said depending legs are bent to engage said countersunk portions of said holes.

12. In an electric time piece, a pillar plate having retaining means, a battery mounted vertically on said pillar plate, an elongated resilient spring clip overlying the upper surface of said battery and having its ends engaging said retaining means, said clip resiliently holding said battery in position against said pillar plate.

13. The electric time piece defined in claim 12 wherein at least one of the ends of said resilient spring clip releasably engages said retaining means.

References Cited in the file of this patent

UNITED STATES PATENTS

| | | |
|---|---|---|
| 796,517 | Jackson | Aug. 8, 1905 |
| 983,760 | Patterson | Feb. 7, 1911 |
| 1,949,088 | Strohacker | Feb. 27, 1934 |
| 2,067,352 | Smith | Jan. 12, 1937 |
| 2,449,550 | Eichberg et al. | Sept. 21, 1948 |
| 2,692,944 | Mendelson | Oct. 26, 1954 |
| 2,697,300 | Fohr et al. | Dec. 21, 1954 |
| 2,865,163 | Ensign et al. | Dec. 23, 1958 |